US012589972B2

(12) United States Patent
Weier et al.

(10) Patent No.: US 12,589,972 B2
(45) Date of Patent: Mar. 31, 2026

(54) METHOD FOR CONTROLLING AN ELEVATOR INSTALLATION BY USING A COMPUTER-CONTROLLED MOBILE DEVICE

(71) Applicant: Inventio AG, Hergiswil (CH)

(72) Inventors: Andreas Weier, Alpnach Dorf (CH); David Zumsteg, Buochs (CH); Reto Duss, Ebikon (CH); Roman Ott, Goldau (CH); Steve Ineichen, Buchrain (CH)

(73) Assignee: INVENTIO AG, Hergiswil (CH)

( * ) Notice: Subject to any disclaimer, the term of this patent is extended or adjusted under 35 U.S.C. 154(b) by 1054 days.

(21) Appl. No.: 17/633,260

(22) PCT Filed: Aug. 12, 2020

(86) PCT No.: PCT/EP2020/072588
§ 371 (c)(1),
(2) Date: Feb. 7, 2022

(87) PCT Pub. No.: WO2021/028462
PCT Pub. Date: Feb. 18, 2021

(65) Prior Publication Data

US 2022/0332541 A1 Oct. 20, 2022

(30) Foreign Application Priority Data

Aug. 14, 2019 (EP) .................................... 19191629

(51) Int. Cl.
*B66B 1/34* (2006.01)
*B66B 1/40* (2006.01)

(52) U.S. Cl.
CPC .............. *B66B 1/3461* (2013.01); *B66B 1/40* (2013.01); *B66B 2201/10* (2013.01)

(58) Field of Classification Search
CPC ..... B66B 1/3461; B66B 1/40; B66B 2201/10; B66B 5/0025; B66B 9/00; B66B 1/18
See application file for complete search history.

(56) References Cited

U.S. PATENT DOCUMENTS 4,367,811 A * 1/1983 Yoneda ................. B66B 1/3492 187/394
2019/0210832 A1 * 7/2019 Toutaoui ............... B66B 5/0031

FOREIGN PATENT DOCUMENTS

CN 102602756 A 7/2012
CN 105110113 A 12/2015
(Continued)

*Primary Examiner* — Bickey Dhakal
(74) *Attorney, Agent, or Firm* — Shumaker, Loop & Kendrick, LLP

(57) ABSTRACT

A method for controlling an elevator installation uses a computer-controlled mobile device. The elevator installation includes an elevator shaft having a plurality of shaft thresholds each assigned to one floor, an elevator car having a car threshold and is moveable along the elevator shaft, and a control unit for moving the elevator car. The mobile device has an evaluation unit that communicates with the control unit. Information generated using at least one component of the mobile device as a result of a height deviation between the car threshold and a shaft threshold located opposite the car threshold is received in the evaluation unit, is then evaluated and control information for moving the elevator car is generated. The control information is sent to the control unit to move the elevator car such that the height deviation between the car threshold and the shaft threshold is minimized.

12 Claims, 3 Drawing Sheets

(56) References Cited

FOREIGN PATENT DOCUMENTS

| | | | | |
|---|---|---|---|---|
| CN | 105731199 | A | | 7/2016 |
| CN | 106976769 | A | | 7/2017 |
| CN | 107539855 | A | | 1/2018 |
| EP | 3362394 | B1 | | 8/2018 |
| JP | 2004018174 | A | | 1/2004 |
| JP | 2005089046 | A | | 4/2005 |
| JP | 2010189162 | A | | 9/2010 |
| JP | 2018150542 | A | | 9/2018 |
| JP | 2020026321 | A | * | 2/2020 |
| KR | 101279168 | B1 | | 6/2013 |
| WO | 2017064191 | A1 | | 4/2017 |
| WO | 2018198224 | A1 | | 1/2018 |
| WO | 2018050470 | A1 | | 3/2018 |

* cited by examiner

102 MOBILE DEVICE
120 CONTROL UNIT
125 TOUCH-SENSITIVE SCREEN
300 EVALUATION UNIT
302 INCLINATIION SENSOR
304 HEIGHT SENSOR
310 INPUT PROCESSING UNIT

410 FIRST STEP - INFORMATION RECEIVED BY EVALUATION UNIT
420 SECOND STEP - EVALUATE INFORMATION TO GENERATE CONTROL INFORMATION
430 THIRD STEP - SEND CONTROL INFORMATION TO CONTROL UNIT

METHOD FOR CONTROLLING AN ELEVATOR INSTALLATION BY USING A COMPUTER-CONTROLLED MOBILE DEVICE

FIELD

The present invention relates to a method for controlling an elevator installation using a computer-controlled mobile device. The invention also relates to: an evaluation unit designed to carry out the proposed method; an elevator installation; a computer program product; and a computer-readable medium comprising such a computer program product.

BACKGROUND

Elevators are used to transport people or goods between different floors or height levels of a building or structure. Before an elevator is put into operation, it is usually necessary to set the respective stopping positions of an elevator car at the individual floors via an elevator controller so that a door threshold of the elevator car is as flush as possible with a door threshold or floor threshold of the relevant floor in each stopping position.

In order to measure the individual height deviations between the door threshold of the elevator car and the door or floor thresholds of the floors, a technician usually travels with the elevator car from floor to floor and measures and notes the individual height deviations manually. After measuring all floors, the technician manually inputs the noted measurement values into the elevator controller.

It is known to record measurement values relating to an elevator installation with the aid of a mobile terminal device, for example a smartphone, or to display or set configuration data for configuring an elevator installation via a mobile terminal device.

WO 2018/050470 A1, for example, describes a method in which measurement values can be recorded via a sensor integrated in a mobile terminal device as soon as it is recognized that the mobile terminal device is in the region of a shaft door of an elevator installation. For evaluation, the measurement values can be transmitted to a central evaluation unit such as a server.

WO 2017/064191 A1 discloses an approach whereby position data of car stopping positions of an elevator installation can be displayed on a mobile terminal device and can be changed by corresponding user inputs. The car stopping positions can be measured using position-measuring means in the elevator installation. The changed position data can then be transmitted to a configuration unit of the elevator installation.

Thus far, measuring and setting the individual stopping positions when commissioning an elevator installation has been a relatively complex and error-prone process that requires well-trained personnel and a very meticulous working method. In particular, reading or clerical errors are difficult to avoid with sufficient reliability when the measurement values are recorded and noted manually, and so an additional test run is usually required to check the stopping positions set on the basis of the measurement values.

SUMMARY

Among other things, there may be a need for a method for controlling an elevator installation using a computer-controlled mobile device in which the setting of stopping positions of an elevator car can be carried out in a simplified, faster and more cost-effective manner, and/or with a reduced risk of errors. Furthermore, there may be a need for an appropriately configured evaluation unit and an elevator installation that communicates with such an evaluation unit, as well as a computer program product configured to carry out the method and a computer-readable medium provided with the product.

A need of this kind can be satisfied by the subject matter according to any of the advantageous embodiments defined in the following description.

A first aspect of the invention relates to a method for controlling an elevator installation using a computer-controlled mobile device. The elevator installation can comprise an elevator shaft having multiple shaft thresholds each assigned to one floor, an elevator car which has a car threshold and can be moved along the elevator shaft, and a control unit for moving the elevator car. The mobile device can have an evaluation unit which is designed to communicate with the control unit. The method comprises at least the following steps, preferably in the sequence provided. In a first step, information generated using at least one component of the mobile device as a result of a height deviation between the car threshold and a current shaft threshold located opposite the car threshold is received in the evaluation unit. Subsequently, in a second step, the information is evaluated and control information for moving the elevator car is generated. Finally, in a third step, the control information is sent to the control unit in order to move the elevator car in such a way that the height deviation between the car threshold and the current shaft threshold is minimized.

A second aspect of the invention relates to an evaluation unit which is designed to carry out and/or control a method according to an embodiment of the first aspect of the invention.

A third aspect of the invention relates to an elevator installation which comprises an elevator shaft having multiple shaft thresholds each assigned to one floor, an elevator car which has a car threshold and can be moved along the elevator shaft, and a control unit for moving the elevator car. The control unit is designed to communicate with an evaluation unit according to an embodiment of the second aspect of the invention.

A fourth aspect of the invention relates to a computer program product having computer-readable instructions which, when executed on a computer-controlled mobile device, instruct the device to carry out a method according to an embodiment of the first aspect of the invention.

A fifth aspect of the invention relates to a computer-readable medium on which a computer program product according to an embodiment of the fourth aspect of the invention is stored.

Possible features and advantages of embodiments of the invention can be considered, inter alia and without limiting the invention, to be based upon the concepts and findings described below.

As indicated at the outset, the height adjustment of an elevator car with respect to the door openings of individual floors has thus far been based predominantly on manual processes, which can be associated with a corresponding susceptibility to error. In particular, for example, the processes of applying a measuring tape, reading measurement values, noting the measurement values and finally inputting the measurement values into the elevator controller by a technician can lead to inaccuracies or errors which may require a subsequent check of the individual stopping positions of the elevator car and, if necessary, a further height adjustment with a further subsequent check. For example, measurement values may accidentally be mixed up and assigned to the wrong floor.

An elevator controller usually has an integrated human-machine interface, or HMI for short, via which the technician can input or change configuration data. The human-machine interface expediently has a display and several input keys for operating the elevator controller. Depending on the design of the human-machine interface, the manual input of the measurement values into the elevator controller can be cumbersome and therefore prone to error, which is why appropriate training of the technician is usually required for correct operation.

The entire process of height adjustment can therefore be very complex and take a lot of time.

In brief, therefore, the approach presented here proposes to carry out the (fine) adjustment of individual stopping positions of an elevator car with the aid of a computer-controlled mobile device, in particular for example a smartphone, tablet or laptop.

A mobile device can generally be understood to mean a portable electronic device that a technician can easily carry with him. An application programmed specifically for the (fine) adjustment of the stopping positions, also known as an app for short, can be run on the mobile device. With this application and using wired and/or wireless data communication options that are typically available to a modern computer-controlled mobile device, the mobile device can be specially configured to exchange data with a control unit controlling the elevator installation. For example, the application can be programmed to send control commands for moving the elevator car to the control unit, so that the mobile device conveniently functions as a type of remote control for the control unit. The (fine) adjustment of the stopping positions can thus be carried out without prior manual input of correction values into the control unit, which saves time and eliminates potential sources of error.

Furthermore, modern mobile devices are often equipped with sensors for measuring different physical variables. These sensors can advantageously be used to measure measurement values—which were previously measured, read and input for the most part manually—at least largely automatically and to transmit them to the control unit with the aid of the above-mentioned data communication options. This eliminates the need for manual measurement of the height deviations between the car threshold and the door threshold, or more precisely the (possibly repeated) reading, noting and inputting of individual measurement values in this regard.

In other words, the entire process of height adjustment of an elevator car, more precisely the (fine) adjustment of the car threshold with respect to the respective shaft thresholds of the individual floors, can be significantly accelerated, simplified and made more convenient with the aid of the approach presented here. In particular, reading and input errors can be avoided due to the direct data transmission between the mobile device and the control unit. This means that in most cases there is no need for additional learning or test runs, as has been the case up to now. Also, with the aid of the approach presented here, a potentially complicated handling of a user interface of the control unit and thus also a corresponding training of technicians can be dispensed with in those cases in which data that are required for the (fine) adjustment of the height position of the elevator car are sent directly from the mobile device to the control unit.

A car threshold can be understood to mean a threshold of the elevator car, in particular a door threshold of a car door of the elevator car. A shaft threshold can be understood to mean an elevator shaft threshold assigned to a floor, in particular a door threshold of a shaft door. In more general terms, the shaft threshold can also be understood as a bottom edge of a shaft opening via which the elevator car is accessible from a floor.

A control unit can be understood to mean a module having a plurality of electrical and/or electronic components for controlling various actuators of the elevator installation, in particular a drive for moving the elevator car, for example. The control unit can be designed to communicate with the mobile device via a wired and/or wireless data communication link, for example a cellular radio, WLAN or Bluetooth connection.

An evaluation unit can be understood as an electronic module that is integrated in the mobile device and is configured to execute a computer-controlled application for controlling the elevator installation. The evaluation unit can be designed analogously to the control unit in order to communicate directly with the control unit via the wired and/or wireless data communication link. Alternatively, the data communication with the control unit can take place via a communication component of the mobile device which is arranged separately from the evaluation unit, the evaluation unit being able to send the control information to the control unit via the communication component.

For example, information generated using at least one component of the mobile device can be information that was generated as a result of a user input, such as by touching a touch-sensitive screen of the mobile device, or that was generated by one or more integrated sensors of the mobile device. The user input can come about, for example, when a technician establishes the height deviation between the car threshold and the current shaft threshold and, as a result of this, makes a corresponding input in an application running on the mobile device, with corresponding information being generated and received in the evaluation unit. Specifically, the input can be e.g. a control command for moving the elevator car or also a value of the height deviation measured by the technician. An integrated sensor can be, for example, an inclination sensor for measuring an inclination of the mobile device or a height sensor for measuring a height of the mobile device. The integrated sensor can be used for example to measure the height deviation and to generate corresponding information, which is then received in the evaluation unit.

A height deviation can be understood as a vertical offset, i.e. an offset in a movement direction of the elevator car, between the car threshold and the current shaft threshold. In other words, in a stopping position of the elevator car, the car threshold may be lowered or raised relative to the current shaft threshold depending on the height deviation, so that a corresponding step is formed which can be a hindrance when exiting or entering the elevator car. By generating and sending appropriate control information, the elevator car can now be moved until the step disappears, i.e. until the car threshold and the current shaft threshold are approximately at the same height and thus form an approximately stepless transition. Depending on the requirements, this adjustment can be carried out with an accuracy in the single-digit millimeter range, for example, and can in this sense be referred to as fine adjustment.

The control information can include, for example, one or more control commands generated on the basis of a user input for controlling the control unit and/or sensor data generated by one or more sensors of the mobile device and/or data obtained through further processing of this sensor data.

As already mentioned, the mobile device can have an inclination sensor. According to one embodiment, the information can include sensor data which were generated by the inclination sensor in a position of the mobile device in which the mobile device rests on the one hand on the car threshold and on the other hand on the current shaft threshold and thus has an inclination angle which is dependent on the height deviation between the car threshold and the current shaft threshold. The control information can include height deviation information determined on the basis of the sensor data.

For example, the mobile device can be placed longitudinally or transversely or in some other predetermined orientation over a gap between the car threshold and the current shaft threshold in order to measure the inclination angle by means of the inclination sensor. To measure the inclination angle, for example, a very precise orientation of the mobile device relative to the car threshold and the current shaft threshold can be specified. In particular, the orientation may be predetermined depending on a device type of the mobile device, i.e. its dimensions and its shape. This ensures that the measurement of the inclination angle is carried out on each floor under approximately identical measurement conditions.

The inclination angle can be measured in a stationary and/or changing position of the mobile device. The position of the mobile device may change when measuring the inclination angle, for example in that the elevator car is moved according to the height deviation while the mobile device rests on the car threshold and the current shaft threshold. The minimization of the height deviation can thus take place as part of a closed control loop in which continuous feedback regarding the change in the height deviation to the control unit takes place.

The height deviation information can be, for example, a length value which is calculated from the sensor data and indicates the vertical offset between the car threshold and the current shaft threshold. It is also possible, however, for the height deviation information to include the sensor data per se or values relating to the height deviation which are manually input into the application by a user. The length value can be a dimension figure, for example with the millimeter unit, or a ratio. Alternatively or additionally, the height deviation information can indicate a change in the length value calculated from the sensor data when the elevator car moves. For example, the height deviation information can in this case indicate whether the length value increases or decreases when the elevator car moves. It is also possible for the height deviation information to merely indicate whether the height deviation is positive or negative, i.e. whether the car threshold is above or below the current shaft threshold.

A particular advantage of this embodiment is that the manual recording of measurement values by a technician can be dispensed with and, instead, sensor data can be used which can be provided by an inclination sensor which is often already present, in particular when using a smartphone, without additional costs. Since the mobile device can be used as a measuring device without significant hardware modifications, no additional measuring devices, for example those that are part of the elevator installation, are required for (fine) adjustment of the stopping positions.

According to one embodiment, the height deviation information can indicate a first direction and/or a second direction. The control unit can be configured to move the elevator car in the first direction and/or the second direction on the basis of the height deviation information. The first and the second direction can be opposite to each other. For example, the control unit can be configured to move the elevator car in the first direction if the height deviation information indicates the second direction, i.e. for example to raise the elevator car when the height deviation information indicates that the car threshold is below the current shaft threshold. Additionally or alternatively, the control unit can be configured to move the elevator car in the second direction if the height deviation information indicates the first direction, i.e. for example to lower the elevator car when the height deviation information indicates that the car threshold is above the current shaft threshold. As a result, the elevator installation can be controlled in a direction-based manner in order to minimize the height deviation. This has the advantage that uncertainties in connection with positioning the mobile device as accurately as possible relative to the car and shaft threshold, such as can occur when measuring absolute values of the inclination angle, can be avoided.

According to one embodiment, the sensor data can be evaluated together with a predefined target value range with regard to the inclination angle. In doing so, a termination command for terminating the movement can be generated and sent to the control unit if the inclination angle is within the specified target value range. The target value range can be selected such that the car threshold ends so as to be approximately flush with the current shaft threshold after the elevator car has been adjusted, provided that the inclination angle is within the target value range. Depending on the requirements, the target value range can include values from 0 to 2 degrees, for example. The target value range can also be selected for example such that the height deviation after the elevator car has been adjusted is at most 2 mm, 5 mm or 10 mm. As a result, the movement can be ended automatically when the adjustment of the elevator car has been carried out with sufficient accuracy.

According to one embodiment, the information can include an input by a user in an application executed by the mobile device for controlling the elevator installation. The control information can include a control command to the control unit on the basis of the input by the user. As already mentioned, the input by the user can involve, for example, touching a control portion of a touch-sensitive screen of the mobile device or, alternatively or additionally, actuating a physical control button of the mobile device. The application can be configured to convert the user's input into a corresponding control command that can be read by the control unit of the elevator installation. The application can be written in any programming language and programmed with corresponding interfaces, for example in the form of control surfaces and/or input fields. The control command can specify a movement of the elevator car, for example. Alternatively or in addition, the control command can also describe a value of the height deviation entered by the user, which can be used by the control unit to move the elevator car accordingly. This embodiment allows a technician to control the elevator installation in a virtually location-independent manner, in particular if the data communication between the mobile device and the control unit is wireless, as is usually the case with modern mobile devices.

According to one embodiment, the application can comprise a first interface for inputting an upward movement and/or a second interface for inputting a downward movement. A first control command can be generated in order to move the elevator car upward when the input is made via the first interface and/or a second control command can be generated in order to move the elevator car downward when the input is made via the second interface. The interfaces can be designed, for example, as touch-sensitive control surfaces, also referred to as buttons. The control surfaces can be arranged separately from one another and/or can be visually differentiated from one another, for example. This can greatly simplify the operation of the application, and thus the control of the elevator installation, especially in comparison with the user interfaces of conventional elevator controllers.

According to one embodiment, the control command can specify a movement path and/or a movement direction and/or a movement duration and/or a movement speed of the elevator car. As a result, the elevator car can be moved very precisely, for example at a particularly low speed, depending on the requirements.

According to one embodiment, the control information can include floor information relating to a floor assigned to the current shaft threshold. The floor information can encode a floor number such as "first floor" or "second floor," for example. This allows the control information to be automatically assigned to a specific floor. This avoids mix-ups which can occur when measurement values and floor information are entered manually.

According to one embodiment, the mobile device can have a height sensor. The information can include further sensor data generated by the height sensor. It is possible for the floor information to have been generated on the basis of the further sensor data. The height sensor can be a barometer or a GPS sensor of the mobile device, for example. Correspondingly, the further sensor data can be air pressure data or geographical position data, which can indicate the height of the mobile device and thus the height of the car or shaft threshold. The floor information can thus be generated without the use of additional sensors, for example permanently installed magnetic sensors and corresponding code tapes, as may be conventionally used in an elevator installation.

Embodiments of the described method can advantageously be carried out using an evaluation unit according to an embodiment of the second aspect of the invention.

Such an evaluation unit can be enabled to carry out embodiments of the described method with the aid of an application, specially programmed for this purpose, according to an embodiment of the third aspect of the invention.

According to the fourth aspect of the invention, a computer program product can be configured, when executed on the computer-controlled mobile device, to prompt the mobile device to carry out or control the steps to be carried out by the mobile device as part of the method described herein. In other words, the computer program product of the fourth aspect of the invention can be viewed as the application by means of which the mobile device is programmed in order to be able to carry out its task in the described method. The computer program product can be programmed in any computer language.

The computer program product can be stored on any computer-readable medium. For example, the computer program product can be stored on a portable computer-readable medium, such as a flash memory, a CD, a DVD, or the like. Alternatively, the computer program product can be stored on a permanently installed computer or server and downloaded therefrom, for example, via a network such as the Internet. In particular, the computer program product can be stored on computers that are part of a cloud.

It is noted that some of the possible features and advantages of the invention are described herein with reference to different embodiments of the control method, the evaluation unit configured to carry out the method, and/or the elevator installation communicating therewith. A person skilled in the art will recognize that the features may be combined, adapted or replaced as appropriate in order to arrive at further embodiments of the invention.

Embodiments of the invention will be described below with reference to the accompanying drawings, with neither the drawings nor the description being intended to be interpreted as limiting the invention.

The drawings are merely schematic and not to scale.

DETAILED DESCRIPTION

Figure 1:
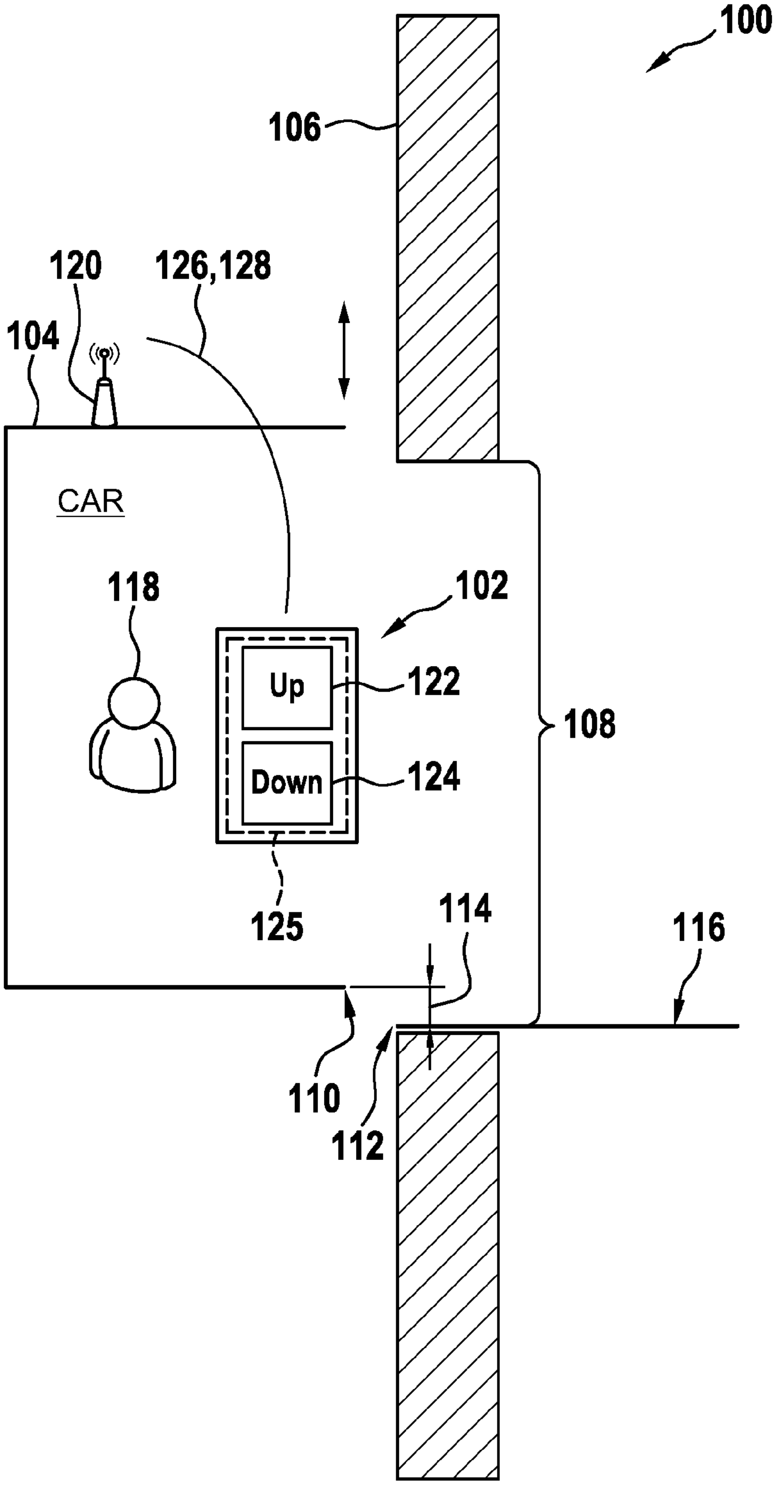
FIG. 1 shows an elevator installation and a computer-controlled mobile device for carrying out a method according to one embodiment of the invention.

FIG. 1 shows an elevator installation 100 and a computer-controlled mobile device 102 for carrying out a method according to one embodiment of the invention. The elevator installation 100 comprises an elevator car 104 which can be moved in an elevator shaft 106. The elevator shaft 106 is indicated schematically here by a wall with a shaft opening 108 which allows access to the elevator car 104, for example from a floor of a building. In reality, the elevator shaft 106 can have a plurality of such shaft openings 108 depending on the number of floors in the building. The elevator car 104 is in a stopping position opposite the shaft opening 108. A car threshold 110 of the elevator car 104 is slightly vertically offset from a shaft threshold 112 of the shaft opening 108, i.e. there is a height deviation 114 between the car threshold 110 and the shaft threshold 112, which is represented as a small step between the elevator car 104 and a floor 116 of the relevant floor in the building. The car threshold 110 and the shaft threshold 112 are in each case a door threshold in particular. By way of example, in FIG. 1 the car threshold 110 is located above the shaft threshold 112.

In the elevator car 104 there is a technician 118, for example a commissioning engineer, who travels from floor to floor for fine adjustment of the individual stopping positions of the elevator car 104 at the respective shaft openings 108. For this purpose, the technician 118 uses the mobile device 102, which in this example is their personal service smartphone. The mobile device 102 is designed to communicate with a control unit 120 of the elevator installation 100. In particular, this communication takes place via a wireless data connection by means of cellular radio, WLAN and/or Bluetooth, as shown in FIG. 1. A special application for controlling the elevator installation 100 runs on the mobile device 102.

According to this embodiment, the application is configured with a first interface 122 and a second interface 124 for processing inputs from the technician 118. The two interfaces 122, 124 are designed here as separate touch-sensitive buttons that can be actuated by touching a touch-sensitive screen 125 of the mobile device 102. The mobile device 102 is designed to generate a first control command 126 when the button of the first interface 122 labeled "Up" is touched, and a second control command 128 when the button of the second interface 124 labeled "Down" is touched. The control commands 126, 128 are sent wirelessly from the mobile device 102 to the control unit 120, which is designed to move the elevator car 104 upward when receiving the first control command 126 or downward when receiving the second control command 128. In this example, the technician 118 expediently actuates the button of the second interface 124 in order to move the elevator car 104 downward in accordance with the height deviation 114 so that the car threshold 110 is approximately at the same height as the shaft threshold 112. The mobile device 102 or the application running on it thus functions as a type of remote control for the control unit 120.

Depending on the configuration of the application, in addition to the movement direction, the technician 118 can input further information relating to the control of the elevator car 104 into the mobile device 102, in particular values relating to a movement speed, a movement duration or a movement path of the elevator car 104. These values are sent to the control unit 120 analogously to the control commands 126, 128 and are further processed by the unit in a suitable manner in order to control the elevator car 104. Depending on the requirement for an accuracy with which the car threshold 110 is to be positioned in the vertical direction with respect to the shaft threshold 112, the technician 118 can move the elevator car 104 for example very slowly by means of a corresponding input in the application in order to reduce the height deviation 114 to a target value range of a few millimeters, such as from 0 to a maximum of 2 mm.

Figure 2:
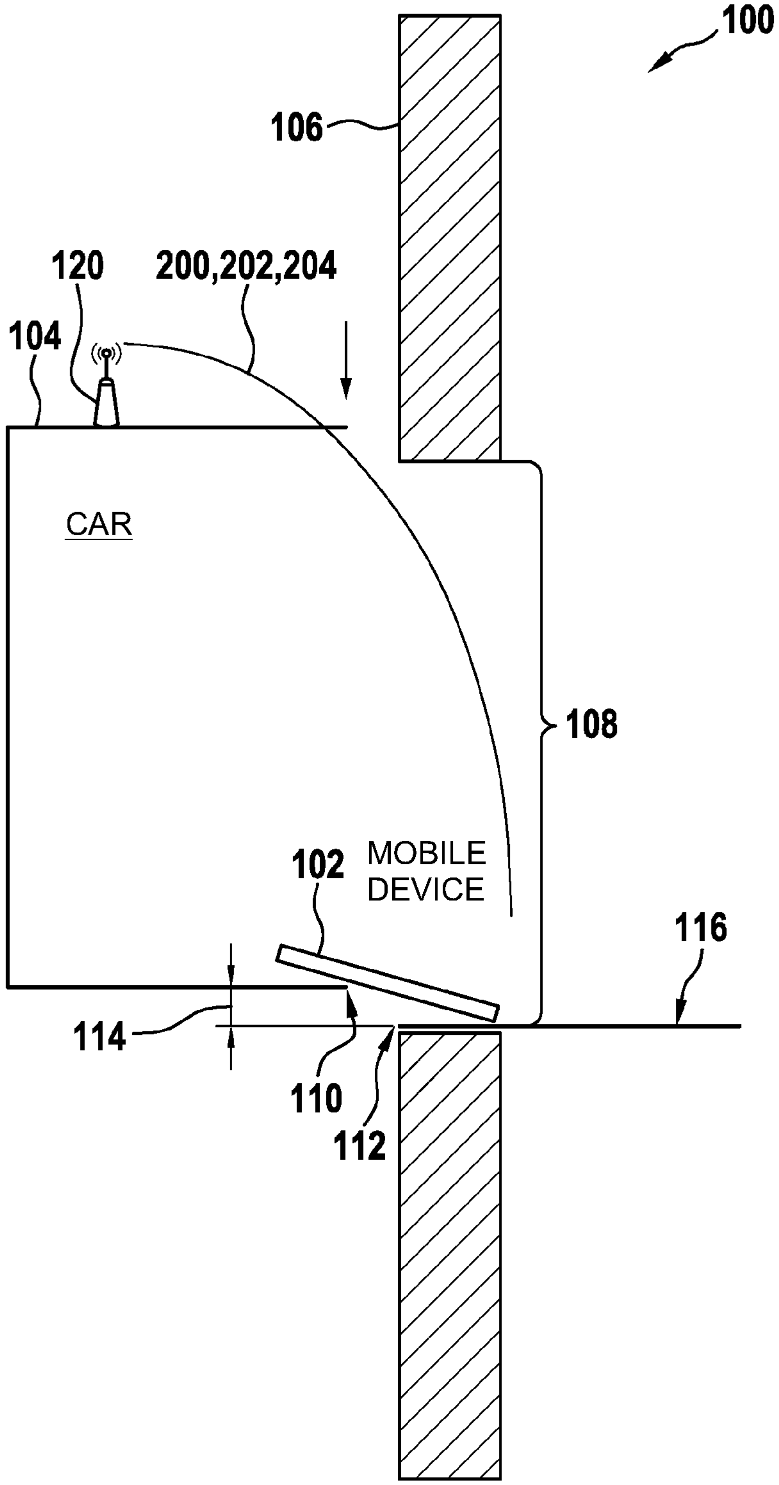
FIG. 2 shows an elevator installation and a computer-controlled mobile device for carrying out a method according to a further embodiment of the invention.

FIG. 2 shows the elevator installation 100 and the computer-controlled mobile device 102 according to a further embodiment of the invention. The situation shown is the same as in FIG. 1, with the difference being that a sensor system integrated in the mobile device 102 is used here to detect the height deviation 114 or to control the elevator car 104. The height deviation 114 is thus not detected here by the technician 118 themselves, for example by measuring or simply seeing the height deviation 114, but is detected in an automated manner by means of the mobile device 102 or the application running on it which is specially programmed for this purpose.

According to this embodiment, the mobile device 102 is designed to measure its inclination. This can advantageously be used to detect the height deviation 114. For this purpose, the technician 118 (not shown) positions the mobile device 102 on the one hand on the car threshold 110, and on the other hand on the shaft threshold 112, so that the mobile device 102 has an inclination which corresponds to the height deviation 114 and is measured as an inclination angle by the sensor system of the mobile device 102. Based on the inclination angle, the mobile device 102, more precisely the application running on it for controlling the control unit 120, calculates height deviation information 200 that indicates the height deviation 114. Depending on the design, the height deviation information 200 includes an absolute value of the height deviation 114 or, alternatively or in addition, directional information that only indicates a direction of the height deviation 114, i.e. for example whether the car threshold 110, as shown in FIG. 2, is offset positively, i.e. upward relative to the shaft threshold 112, or negatively, i.e. downward relative to the shaft threshold 112.

The mobile device 102 then sends the height deviation information 200 to the control unit 120, which is designed to evaluate the height deviation information 200 and to move the elevator car 104 up or down depending on the result of this evaluation. In FIG. 2, the height deviation information 200 indicates the positive offset of the car threshold 110 relative to the shaft threshold 112. Accordingly, the control unit 120 moves the elevator car 104 downward in a direction opposite to this positive offset.

If, on the other hand, the height deviation information 200 includes an absolute length value, calculated from the inclination angle, with regard to the height deviation 114, then this length value can be used by the control unit 120 to determine a corresponding movement path of the elevator car 104. In this case, the control unit 120 moves the elevator car 104 on the basis of the height deviation information 200 for example until the inclination angle measured by the mobile device 102 or the length value calculated from the inclination angle is within a target value range that specifies an accuracy to be achieved in the fine adjustment of the elevator car 104.

When the target value range is reached, according to one embodiment, the mobile device 102 automatically sends a termination command 202 to the control unit 120 in order to terminate the movement. For example, with such an automatic termination of the movement, the new stopping position of the elevator car 104 is automatically stored in the control unit 120.

It is also advantageous if the mobile device 102 additionally sends floor information 204 to the control unit 120, which informs the control unit 120 of the floor on which the elevator car 104 is currently located. Similarly to the height deviation 114, the floor information 204 can also be determined by means of the sensor system of the mobile device 102, for example by means of an integrated barometer or an integrated GPS sensor. This allows e.g. an automatic assignment of the height deviation information 200 to the relevant current floor.

Figure 3:
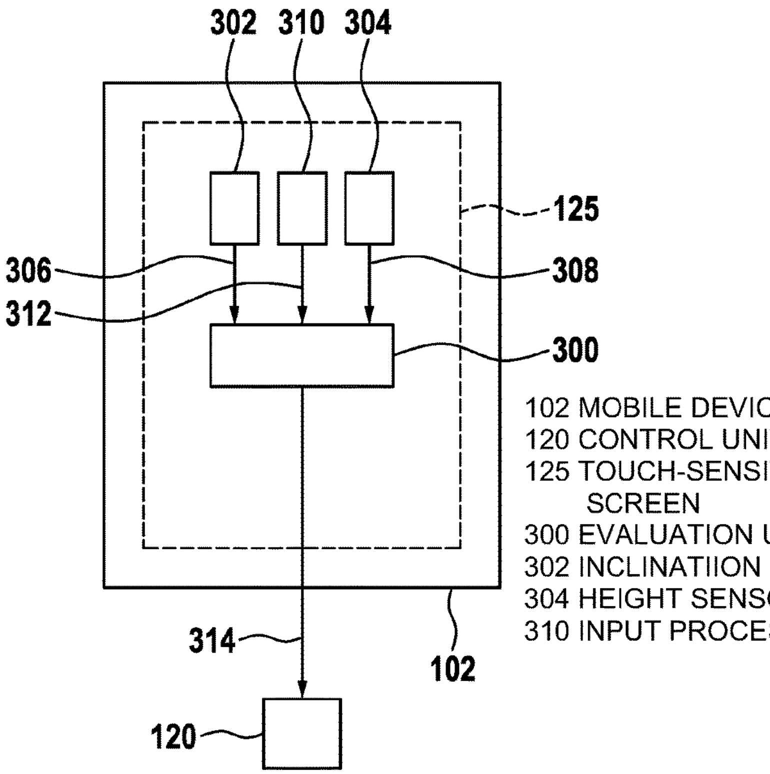
FIG. 3 shows a computer-controlled mobile device with an evaluation unit according to one embodiment of the invention.

FIG. 3 shows the computer-controlled mobile device 102 with an evaluation unit 300 which is designed to carry out a method according to one embodiment of the invention. The evaluation unit 300 is used in particular to carry out the application as described above with reference to FIGS. 1 and 2.

According to this embodiment, the mobile device 102 has, on the one hand, an inclination sensor 302 for measuring the inclination angle of the mobile device 102 and, on the other hand, a height sensor 304 for measuring a height of the mobile device 102. The inclination sensor 302 and the height sensor 304, which are components of the sensor system of the mobile device 102 mentioned in the context of FIGS. 1 and 2, are each coupled to the evaluation unit 300, so that the inclination sensor 302 can send sensor data 306 relating to a measured inclination angle and the height sensor 304 can send further sensor data 308 relating to a measured height to the evaluation unit 300. The evaluation unit 300 is designed to generate the height deviation information 200 on the basis of the sensor data 306 and send it to the control unit 120. It is also possible for the evaluation unit 300 to forward the sensor data 306 directly to the control unit 120 for further processing. Additionally or alternatively, the evaluation unit 300 is designed to generate the floor information 204 on the basis of the further sensor data 308 and send it to the control unit 120. Here, too, it is conceivable that the evaluation unit 300 merely forwards the further sensor data 308 to the control unit 120, instead of the floor information 204, so that the unit can determine the corresponding floor from the further sensor data 308.

In addition, the evaluation unit 300 is coupled to the touch-sensitive screen 125 via an input processing unit 310.

The input processing unit 310 is designed to convert the inputs by the technician 118 into corresponding input data 312 that can be evaluated by the evaluation unit 300.

On the basis of these data 306, 308, 312, the evaluation unit 300 generates control information 314 which is suitable for processing by the control unit 120. Depending on the design, the control information 314 includes, as already described, e.g. the control commands 126, 128, the termination command 202, the height deviation information 200 and/or the floor information 204. Additionally or alternatively, the control information 314 includes the sensor data 306, the further sensor data 308 and/or the input data 312 for external processing by the control unit 120.

Figure 4:
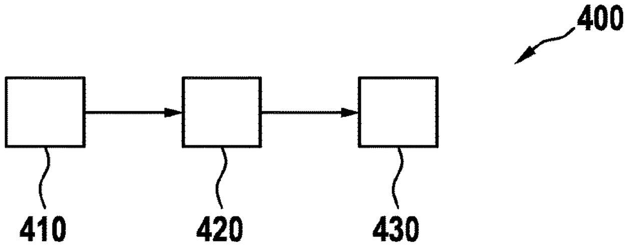
FIG. 4 shows a flow chart for a method according to one embodiment of the invention.

FIG. 4 shows a flow chart for a method 400 according to one embodiment of the invention. The method 400 can be carried out for example with the elevator installation 100 and the mobile device 102 as described with reference to FIGS. 1 to 3.

The method 400 comprises a first step 410, in which information, for example the input information 312, the sensor data 306 and/or the further sensor data 308, i.e. information that is generated as a result of the height deviation 114 by means of one or more components of the mobile device 102, for example by means of the screen 125, the inclination sensor 302 and/or the height sensor 304, is received in the evaluation unit 300.

The evaluation unit 300 then evaluates this information in a second step 420 in a corresponding manner in order to generate the control information 314.

Finally, in a third step 430, the evaluation unit 300 sends the control information 314 to the control unit 120 so that it can move the elevator car 104 up or down in a corresponding manner using the control information 314 to minimize the height deviation 114.

In addition and partly with a choice of words deviating from the wording previously used, possible properties, details and/or advantages of embodiments of the invention can be described as follows.

In particular, a cellphone having a corresponding application is used as the mobile device 102 for precise adjustment of a car floor comprising the car threshold 110 when commissioning the elevator installation 100. The technician 118 travels with the elevator car 104 from floor to floor and places the cellphone 102 in each case over the car threshold 110, for example a door threshold of the elevator car 104, and a current shaft threshold 112, for example a door threshold of a current floor. Inclination sensors 302 in the cellphone 102 then measure an inclination and calculate a deviation between a car position and a floor position. This deviation is sent together with a current floor position via a wireless communication link such as WLAN or Bluetooth to an elevator controller in the form of the control unit 120, which adjusts the car position accordingly.

As an alternative or in addition to an automatic adjustment of the elevator car 104 by the control unit 120, the technician 118 can also for example tap a corresponding button in the commissioning application themselves, for example in the form of an up or down button, in order to correct the deviation between the car position and the floor position. The application sends this input information, also referred to as input data 312 above, together with the current floor position via the wireless communication link to the control unit 120, which adjusts the car position in accordance with the input information.

As already mentioned, the technician 118 would normally have traveled from floor to floor with the elevator car 104, measured the deviation between the car and floor position with a tape measure, and noted the measurement values. After measuring all floors, he would have input the noted measurement values into the elevator controller via a user interface. Under certain circumstances, a further test run would have been necessary.

In contrast, the approach presented here offers the advantage whereby manual measurement and input of measurement values via a user interface can be dispensed with. This avoids errors when measuring or inputting. Instead, the floor positions are stored in the application of the cellphone 102 and are sent to the control unit 120 together with the deviation measurement values detected by sensors. The resulting adjustment of the car can be observed directly by the technician 118. This means that commissioning is much faster and less prone to error.

In a first variant, the cellphone 102 is placed at a transition between the thresholds of the car door and the floor door in order to measure an inclination angle of the cellphone 102 by means of the inclination sensor 302 integrated in the cellphone 102. The height deviation 114 between the two thresholds 110, 112 is then calculated on the basis of the inclination angle.

The calculated height deviation 114 is then transmitted to the control unit 120. The control unit 120 moves the elevator car 104 on the basis of the height deviation 114, for example until the cellphone 102 is in a horizontal position, i.e. an inclination of approximately 0 degrees is calculated.

In a second variant, the elevator car 104 is controlled by the application, more precisely by the technician 118, who specifies to the control unit 120, via a corresponding input in the application, how far and in which direction the elevator car 104 should be moved so that the two thresholds 110, 112 are aligned with one another. The mobile phone 102 communicates directly with the control unit 120, for example via WLAN or Bluetooth. Communication via a cloud is also conceivable.

It is also possible for the cellphone 102 to independently determine a current floor position and to transmit this height information, also referred to above as floor information 204, to the control unit 120.

For example, the cellphone 102 may also automatically provide feedback as soon as it is in the horizontal position, which indicates that the measurement is complete.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for controlling an elevator installation using a computer-controlled mobile device, wherein the elevator installation includes an elevator shaft having multiple shaft thresholds, each of the shaft thresholds being at an associated one of multiple floors spaced along the elevator shaft, an elevator car having a car threshold and being moveable along the elevator shaft, and a control unit for moving the elevator car between the shaft thresholds, wherein the mobile device has an evaluation unit that is adapted to communicate with the control unit, the method comprising the steps of:

receiving in the evaluation unit information generated using at least one component of the mobile device, the information resulting from a height deviation between the car threshold and a current shaft threshold located opposite the car threshold, the current shaft threshold being one of the shaft thresholds in the elevator shaft, wherein the information includes a control command for controlling the elevator installation generated from an input to the mobile device by a user;

evaluating by the evaluation unit the information received and generating control information for moving the elevator car; and sending the control information from the mobile device to the control unit wherein the control unit moves the elevator car in response to the control information such that the height deviation between the car threshold and the current shaft threshold is minimized.

2. The method according to claim 1 wherein the mobile device includes an inclination sensor, wherein the information includes sensor data generated by the inclination sensor in a position of the mobile device with the mobile device resting on the car threshold and on the current shaft threshold at an inclination angle which dependent on the height deviation between the car threshold and the current shaft threshold, and wherein the control information includes height deviation information determined based on the sensor data.

3. The method according to claim 2 wherein the height deviation information indicates a direction, and wherein the control unit is adapted to move the elevator car in the direction or opposite the direction based on the height deviation information to minimize the height deviation between the car threshold and the current shaft threshold.

4. The method according to claim 2 wherein the sensor data are evaluated together with a predetermined target value range for the inclination angle, wherein a termination command for terminating the movement of the elevator car is generated by the evaluation unit and sent to the control unit when the inclination angle is within the target value range.

5. The method according to claim 1 wherein the mobile device runs an application and includes at least one of a first interface for generating a first input representing an upward movement and a second interface for generating a second input representing a downward movement to the application, and wherein the application operates the mobile device to generate and send to the control unit a first control command to move the elevator car upward when the first input is made via the first interface and to generate and send to the control unit a second control command to move the elevator car downward when the second input is made via the second interface.

6. The method according to claim 5 wherein the first control command and the second control command each specify at least one of a movement path, a movement direction, a movement duration and a movement speed of the elevator car.

7. The method according to claim 1 wherein the control information includes floor information relating to a one of the floors associated with the current shaft threshold.

8. The method according to claim 7 wherein the mobile device includes a height sensor, wherein the information includes further sensor data generated by the height sensor, and wherein the floor information is generated based on the further sensor data.

9. The evaluation unit adapted to perform the control method according to claim 1.

10. An elevator installation comprising:

an elevator shaft having a plurality of shaft thresholds, each of the shaft thresholds being associated with a different floor of multiple floors spaced along the elevator shaft;

an elevator car having a car threshold and being moveable along the elevator shaft;

a control unit for controlling movement of the elevator car between the shaft thresholds; and wherein the control unit is adapted to communicate with the evaluation unit according to claim 9.

11. A computer program product having computer-readable instructions which, when executed on a computer-controlled mobile device, instruct the device to carry out the method according to claim 1.

12. A non-transitory computer-readable medium on which the computer program product according to claim 11 is stored.

* * * * *